United States Patent
Causey et al.

(10) Patent No.: US 8,816,965 B2
(45) Date of Patent: Aug. 26, 2014

(54) PREDICTIVE FORCE SENSITIVE KEYPAD

(75) Inventors: Mark Edward Causey, Tucker, GA (US); Jeffrey Norbert Howard, Suwanee, GA (US); Andrew Thomas Smoak, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 412 days.

(21) Appl. No.: 12/571,157

(22) Filed: Sep. 30, 2009

(65) Prior Publication Data

US 2011/0074691 A1    Mar. 31, 2011

(51) Int. Cl.
    G06G 3/02    (2006.01)
    G06F 3/02    (2006.01)
    G06F 3/01    (2006.01)
    H01H 13/85   (2006.01)
    H01H 3/00    (2006.01)

(52) U.S. Cl.
    CPC ............. *G06F 3/0202* (2013.01); *G06F 3/016* (2013.01); *H01H 13/85* (2013.01); *H01H 2215/05* (2013.01); *H01H 2003/008* (2013.01)
    USPC ........... 345/169; 345/168; 400/481; 400/480; 400/472

(58) Field of Classification Search
    CPC .................................................. G06F 3/0216
    USPC .................. 345/168, 169; 400/472, 480, 481
    See application file for complete search history.

(56) References Cited

U.S. PATENT DOCUMENTS

| | | |
|---|---|---|
| 5,128,672 A | 7/1992 | Kaehler |
| 5,483,235 A | 1/1996 | Hanson et al. |
| 5,574,482 A | 11/1996 | Niemeier |
| 5,963,671 A | 10/1999 | Comerford et al. |
| 6,307,541 B1 | 10/2001 | Ho et al. |
| 6,573,844 B1 | 6/2003 | Venolia et al. |
| 6,614,422 B1 | 9/2003 | Rafii |
| 6,724,370 B2 | 4/2004 | Dutta et al. |
| 7,215,327 B2 | 5/2007 | Liu et al. |
| 7,376,938 B1 | 5/2008 | Van der Hoeven |
| 7,583,206 B2 | 9/2009 | Volckers |

(Continued)

FOREIGN PATENT DOCUMENTS

JP    2000330946    11/2000

OTHER PUBLICATIONS

Hoffmann et al., "TypeRight: A Keyboard with Tactile Error Prevention," Proceedings of the CHI 2009 International Conference on Human Factors in Computing Systems, Apr. 2009, pp. 1-4.*

(Continued)

*Primary Examiner* — Latanya Bibbins
(74) *Attorney, Agent, or Firm* — Hartman & Citrin LLC (57) ABSTRACT

Devices and methods are described for improving the efficiency of text input by requiring more pressure to select keys on a dynamic keyboard that are improbable key presses. Examples include a text-entry device which has logic for resisting error while the user enters text on a keyboard of the text-entry device. Each key has a lever mechanism which varies the force required to press the key. Keyboard logic on the text-entry device is programmed to change the force required to enter each key within the dynamic keyboard based on the prior entry. The keyboard logic assigns a prediction value to each key based on a statistical probability that the key will be entered next.

15 Claims, 6 Drawing Sheets

(56) References Cited

U.S. PATENT DOCUMENTS

| | | |
|---|---|---|
| 2002/0035486 A1 | 3/2002 | Huyn et al. |
| 2002/0152203 A1 | 10/2002 | Ostergaard et al. |
| 2002/0171633 A1 | 11/2002 | Brinjes |
| 2003/0095102 A1 | 5/2003 | Kraft |
| 2004/0018857 A1 | 1/2004 | Asokan et al. |
| 2004/0095327 A1 | 5/2004 | Lo |
| 2004/0215726 A1 | 10/2004 | Arning et al. |
| 2005/0071778 A1 | 3/2005 | Tokkonen |
| 2005/0167251 A1 | 8/2005 | Sugimura et al. |
| 2005/0188330 A1* | 8/2005 | Griffin ............... 715/816 |
| 2005/0225540 A1 | 10/2005 | Kawakami et al. |
| 2005/0253816 A1 | 11/2005 | Himberg et al. |
| 2006/0009891 A1* | 1/2006 | Pawlak et al. ............ 701/37 |
| 2006/0132446 A1* | 6/2006 | Soh et al. ............... 345/168 |
| 2006/0168539 A1 | 7/2006 | Hawkins et al. |
| 2006/0256139 A1 | 11/2006 | Gikandi |
| 2006/0279434 A1 | 12/2006 | Wang |
| 2007/0016572 A1 | 1/2007 | Bates et al. |
| 2007/0046641 A1* | 3/2007 | Lim ....................... 345/173 |
| 2007/0229476 A1 | 10/2007 | Huh |
| 2007/0288578 A1 | 12/2007 | Pantalone |
| 2008/0174570 A1 | 7/2008 | Jobs et al. |
| 2008/0281583 A1 | 11/2008 | Slothouber |
| 2008/0309621 A1 | 12/2008 | Aggarwal et al. |
| 2009/0040184 A9 | 2/2009 | Pu et al. |
| 2009/0051661 A1 | 2/2009 | Kraft et al. |
| 2009/0106695 A1 | 4/2009 | Perry et al. |
| 2009/0150322 A1 | 6/2009 | Bower et al. |
| 2009/0189864 A1 | 7/2009 | Walker |
| 2009/0195506 A1 | 8/2009 | Geidl |
| 2009/0289958 A1 | 11/2009 | Kim et al. |
| 2009/0319694 A1 | 12/2009 | Slezak et al. |
| 2010/0026650 A1* | 2/2010 | Srivastava et al. ........ 345/173 |
| 2010/0036833 A1 | 2/2010 | Yeung et al. |
| 2010/0085313 A1 | 4/2010 | Rider |
| 2010/0085317 A1 | 4/2010 | Park et al. |
| 2010/0203874 A1 | 8/2010 | Scott et al. |
| 2010/0259561 A1 | 10/2010 | Foruntanpour |
| 2010/0265181 A1 | 10/2010 | Shore |
| 2011/0029862 A1 | 2/2011 | Scott et al. |
| 2012/0050169 A1* | 3/2012 | Ladouceur et al. ....... 345/169 |
| 2012/0244914 A1 | 9/2012 | Lundy et al. |

OTHER PUBLICATIONS

U.S. Office Action dated Oct. 3, 2011 in U.S. Appl. No. 12/570,096.
U.S. Office Action dated Mar. 8, 2012 in U.S. Appl. No. 12/570,096.
U.S. Office Action dated Apr. 24, 2013 in U.S. Appl. No. 12/570,096.
U.S. Office Action dated Sep. 23, 2013 in U.S. Appl. No. 12/570,096.
U.S. Office Action dated Nov. 28, 2011 in U.S. Appl. No. 12/571,053.
U.S. Office Action dated Jul. 9, 2012 in U.S. Appl. No. 12/571,053.
U.S. Office Action dated Nov. 21, 2012 in U.S. Appl. No. 12/571,053.
U.S. Office Action dated May 24, 2013 in U.S. Appl. No. 12/571,053.
U.S. Office Action dated Sep. 25, 2013 in U.S. Appl. No. 12/571,053.
U.S. Office Action dated Nov. 23, 2011 in U.S. Appl. No. 12/571,117.
U.S. Office Action dated Jul. 18, 2012 in U.S. Appl. No. 12/571,117.
U.S. Office Action dated Nov. 26, 2012 in U.S. Appl. No. 12/571,117.
U.S. Office Action dated May 24, 2013 in U.S. Appl. No. 12/571,117.
U.S. Office Action dated Sep. 25, 2013 in U.S. Appl. No. 12/571,117.
U.S. Office Action dated Dec. 22, 2011 in U.S. Appl. No. 12/571,192.
U.S. Office Action dated Nov. 20, 2012 in U.S. Appl. No. 12/571,192.
U.S. Office Action dated Jun. 19, 2013 in U.S. Appl. No. 12/571,192.
U.S. Office Action dated Dec. 2, 2011 in U.S. Appl. No. 12/571,239.
U.S. Office Action dated Jul. 19, 2012 in U.S. Appl. No. 12/571,239.
U.S. Office Action dated Nov. 21, 2012 in U.S. Appl. No. 12/571,239.
U.S. Office Action dated May 24, 2013 in U.S. Appl. No. 12/571,239.
U.S. Office Action dated Sep. 11, 2013 in U.S. Appl. No. 12/571,239.
U.S. Office Action dated Apr. 4, 2014 in U.S. Appl. No. 12/571,053.
U.S. Office Action dated May 7, 2014 in U.S. Appl. No. 12/571,117.
U.S. Office Action dated Apr. 9, 2014 in U.S. Appl. No. 12/571,239.
Hoggan et al., "Investigating the Effectiveness of Tactile Feedback for Mobile Touchscreens," Proc. Of SIGCHI Conf. On Human Factors in Computing Systems, pp. 1573-1582 (Apr. 2008).
Hoffmann et al., "TypeRight: A Keyboard with Tactile Error Prevention," Proc. Of the SIGCHI Conf. On Human Factors in Computing Systems, pp. 2265-2268 (Apr. 2009).
U.S. Office Action dated Jun. 6, 2014 in U.S. Appl. No. 12/571,239.
U.S. Office Action dated Jun. 9, 2014 in U.S. Appl. No. 12/571,053.

* cited by examiner

PREDICTIVE FORCE SENSITIVE KEYPAD

BACKGROUND OF THE INVENTION

1. Field of the Invention

The present invention relates to text-entry devices. More specifically, the present invention relates to dynamic physical keypads.

2. Background of the Invention

Texting and messaging have become increasingly popular among wireless users. Texting gives users a quick and easy way to send a note to someone else without necessarily interrupting. Cellular providers have created a category of Quick Messaging Devices that are consumer based, messaging centric phones that utilize a virtual or physical full QWERTY keyboard to make typing easier. Within the span of less than a year, this segment has grown at a double digit rate.

The current text input methods on mobile devices are quite cumbersome. The hard keyboards on mobile devices require a careful positioning of the finger on the character to prevent mistyping. This is particularly problematic for the elderly and visually handicapped users. These and many other users have the problem of striking multiple keys at once, often due to the relatively small size of the individual keys.

Physical keys generally require a certain amount of force to depress the key to make a physical contact to register a key press. While the manufacturer can increase or reduce the amount of force needed to press a key, it is set and does not change. Many mobile devices offer modes of predictive text to help customers enter the words that they intend to type. However most of these are based on correcting a word after it has been mistyped or allowing the customer to choose from a likely list of possibilities as they are typing. Both methods address the problem during or after the process of mistyping a word.

What is needed is a way of avoiding mistyping before it ever occurs in order to prevent errors and give a user a better experience. Such a device or method should also be able to be used with current predictive text models.

SUMMARY OF THE INVENTION

The present invention includes systems and methods for improving the efficiency of text input by requiring more pressure to select keys on a dynamic keyboard that are improbable key presses. Exemplary embodiments of the present invention include a text-entry device which has logic for resisting error while the user enters text on a keyboard of the text-entry device. Each key has a lever mechanism which varies the force required to press the key. Keyboard logic on the text-entry device is programmed to change the force required to enter each key within the dynamic keyboard based on the prior entry. The keyboard logic assigns a prediction value to each key based on a statistical probability that the key will be entered next.

Furthermore, exemplary embodiments include levers which are electronically variable. Each key has a default force required to enter a key, and that force is varied by varying the power to the lever. In some embodiments the force required is elevated for keys that are not as likely to be entered next based on the prior text entry, and in other embodiments the force required is lowered for keys that are more likely to be entered next based on prior text entry. The force required can be generated by mechanical elements such as a spring or damper system, or by electro-magnetic elements such as a magnet and electric coil.

In one exemplary embodiment, the present invention is a text-entry device for resisting error while entering text. The text-entry device includes a processor, a memory in communication with the processor, a keyboard in communication with the processor having a plurality of keys and each key having a force required to press the key, a display in communication with the processor, and a keyboard logic stored on the memory. The keyboard logic assigns a prediction value to each key after a user enters a key, and adjusts the force required to press at least one key relative to the assigned prediction value.

In another exemplary embodiment, the present invention is a method of resisting error while entering text on a text-entry device having a keyboard. The method includes assigning a prediction value to each key after a user enters a key, and adjusting the force required to press at least one key relative to the assigned prediction value. The keyboard is coupled with a text-entry device.

In yet another exemplary embodiment, the present invention is a computer program stored on a computer readable medium for resisting error while entering text on a text-entry device having a keyboard. The computer program includes a first code segment for assigning a prediction value to each key after a user enters a key, and a second code segment for adjusting the force required to press at least one key relative to the assigned prediction value. The keyboard is coupled with a text-entry device.

DETAILED DESCRIPTION OF THE INVENTION

The present invention includes systems and methods for improving the efficiency of text input by requiring more pressure to select keys on a dynamic keyboard that are improbable key presses. Exemplary embodiments of the present invention include a text-entry device which has logic for resisting error while the user enters text on a keyboard of the text-entry device. Each key has a lever mechanism which varies the force required to press the key. Keyboard logic on the text-entry device is programmed to change the force required to enter each key within the dynamic keyboard based on the prior entry. The keyboard logic assigns a prediction value to each key based on a statistical probability that the key will be entered next.

Furthermore, exemplary embodiments include levers which are electronically variable. Each key has a default force required to enter a key, and that force is varied by varying the power to the lever. In some embodiments the force required is elevated for keys that are not as likely to be entered next based on the prior text entry, and in other embodiments the force required is lowered for keys that are more likely to be entered next based on prior text entry. The force required can be generated by mechanical elements such as a spring or damper system, or by electro-magnetic elements such as a magnet and electric coil.

Based on predictive text and the intended target key(s), the text-device adjusts the level of force required to enter the keys based on the prediction values. For example, the user or provider may have decided that it wants the key pressure to be 190 grams of force to press a key on the QWERTY pad. Through predictive text, while typing "questi . . . " the device determines that the 'O' key is the next key intended to be hit. The device increases the upward pressure of keys surrounding the 'O' key to, for instance, to 300 grams of force, to avoid accidentally pressing those keys.

This design helps facilitate the advantages of predictive text, also known as T9, but combines with the initial input of text before it occurs, thereby resisting mistaken keystrokes by the user before they occur. This implementation is not limited to text but could be implemented for numeric and other forms of input where a virtual keyboard is used. For instance, someone dialing a common phone number could have a 10 digit dialing keyboard that changes the sensitivity of keys as they type. Further, a tablet with a medical questionnaire might change the sensitivity of certain keys based on questions answered in the past.

For example, most hard keyboards known in the art have small keys that are roughly the same size. With many of these devices, multiple keys may be hit at the same time due to their small size and the lack of space between keys. When the user is an elderly person or visually handicapped person using one of these keyboards, the user may have a hard time pressing the correct key and only the correct key. These groups often accidentally press multiple keys at once as their dexterity and/or vision is decreased. However, they may still desire a small device. The present invention helps to alleviate these issues faced by the groups. As the present invention decreases the sensitivity of keys around the likely keystrokes, the invention makes the intended keys easier to hit. Thus, the user, even with limited sight or dexterity, is able to easily type a message without having to constantly correct accidental keystrokes.

Given a corpus of a language (say English), exemplary embodiments of the invention break down the words into a sequence of characters. Using these sequences of characters, the probability of a particular letter following a character is calculated. Using the above example, the probability of 'U' following 'Q' is very high in the English language since 'Q' is almost always followed by 'U'. This notion can be extended to larger contexts as well, such as the probability of an 'E' entered after the three characters 'S', 'T', and 'E'. These probabilities can be used to modify many facets of the soft keyboard.

"Text-entry device," as used herein and throughout this disclosure, refers to an electronic device which accepts an alphanumeric input often supplied by a virtual or physical keyboard. Examples of a text-entry device include notebook computers, tablet computers, personal digital assistants (PDAs), cellular telephones, smart phones, etc.

"Logic," as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memories). Logic may also be comprised by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figures 1A, 1B:
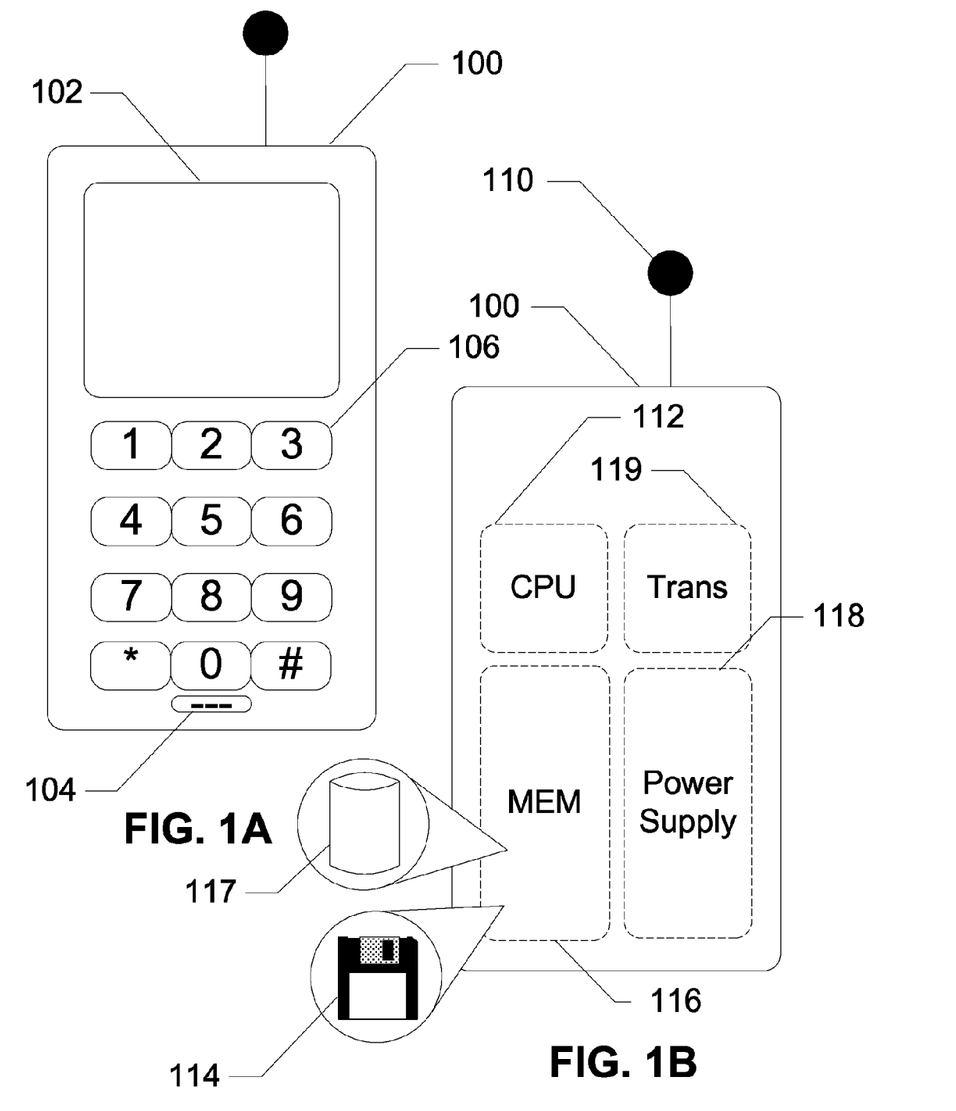
FIGS. 1A and 1B show a text-entry device for resisting error while a user enters text, according to an exemplary embodiment of the present invention.

FIGS. 1A and 1B show a text-entry device 100 for resisting error while a user enters text, according to an exemplary embodiment of the present invention. In this embodiment, text-entry device 100 includes a display 102, a dynamic keyboard 106, a microphone 104, an antenna 110, a transceiver 119, a power supply 118, a central processing unit (CPU) 112, and a memory 116. Display 102 is an LCD or LED screen on which a user can view selections, numbers, letters, etc. Microphone 104 allows the user to verbally communicate with others using text-entry device 100. Dynamic keyboard 106 allows the user to type letters, numbers, and symbols in order to create text messages, e-mails, etc. Keys of dynamic keyboard 106 have different sensitivities according to commands sent from CPU 112. Transceiver 119 allows text-entry device 100 to wirelessly communicate with a network, other wireless devices, etc. Power supply 118 provides power to each of the components of text-entry device 100. CPU 112 commands components of text-entry device 100 according to logic on memory 116. Memory 116 stores logic, data, etc. Among the logic stored on memory 116 is keyboard logic 114. Keyboard logic 114 assigns a prediction value to each key after each key entry, and changes the sensitivity of each key based on its prediction value until the next key is entered, at which time the sensitivity is changed again. Keyboard logic 114 references language database 117 when assigning prediction values. Language database 117 contains, among other things, a dictionary, statistical data, etc. For instance, when the user is typing an e-mail, keyboard logic 114 predicts the next key entry that is necessary to complete a word being typed. Keyboard logic 114 instructs CPU 112 to command keyboard to change the sensitivity of the keys. The keys of the predicted next key entry are more sensitive than other keys of the dynamic keyboard 106 such that they may be entered more easily.

There are many other embodiments of a text-entry device that uses a dynamic keyboard. The embodiment in FIGS. 1A and 1B is similar to that of a cellular telephone or smart phone. Another exemplary embodiment is a PDA having a dynamic keyboard. Most users will find typing easiest using their thumbs. However, other embodiments accommodate users for finger typing. Another exemplary embodiment features a laptop computer with a dynamic keyboard. A laptop computer typically has a much larger keyboard than your average PDA and can accommodate a full size keyboard. The keyboard logic can make this typing experience just as easy by resisting error while a user enters text. Also, a numeric keypad such as that of a cellular telephone utilizes a dynamic keypad. When typing text, the keyboard logic desensitizes the numeric keys surrounding a predicted key based on the prediction values of the associated characters, similar to that of a QWERTY keyboard. When dialing telephone numbers, the keyboard logic references a contacts list on the cellular telephone and calculates prediction values based on statistical patterns from the contacts list.

Figure 2:
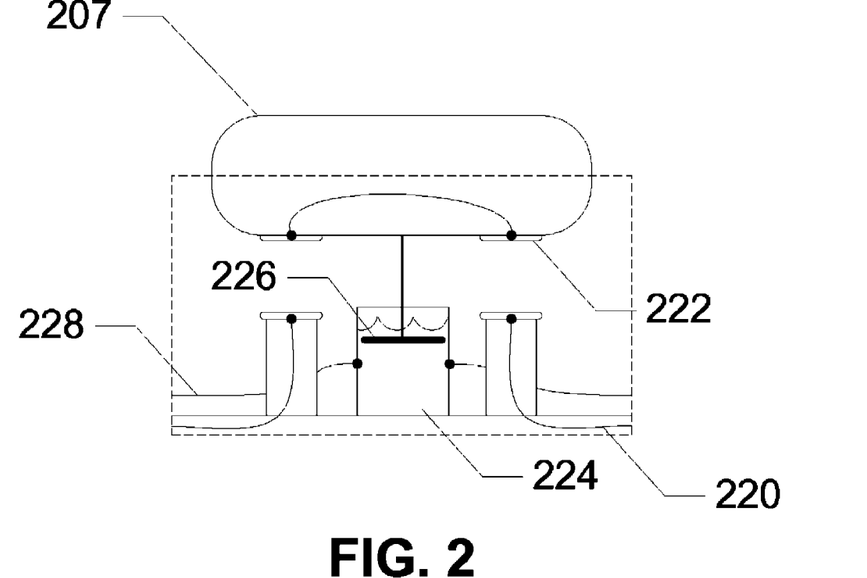
FIG. 2 shows a dynamic key on a keyboard where the sensitivity of the dynamic key is alterable by sending a current through a fluid, according to an exemplary embodiment of the present invention.

FIG. 2 shows a dynamic key on a keyboard where the sensitivity of the dynamic key is alterable by sending a current through a fluid, according to an exemplary embodiment of the present invention. In this embodiment, the dynamic key includes a button 207, a contact 222, a contact wire 220, a fluid 224, a plunger 226, and a current varying wire 228. Button 207 provides a location for the user to press in order to enter a desired character. When button 207 is pressed, contact 222 touches contact wire 220. Contact 222 is a conductive point on either side of button 207 which, when in contact with contact wire 220, creates a closed circuit. When this circuit is closed, the dynamic key sends a signal to the device that the key has been pressed. Fluid 224 is any type of fluid which has a viscosity which changes relative to a current flowing through it. Plunger 226 contains holes of a size such that when no current is flowing through fluid 224, pressing button 207 requires 190 grams of force. Current varying wire 228 runs from a power source through fluid 224 such that current varying wire 228 is in contact with fluid 224. When a current flows through current varying wire 228, the current flows through fluid 224 and to the rest of the length of current varying wire 228 to complete a circuit. By changing the current flowing through this circuit, the viscosity of fluid 224 changes, making it easier or harder to press button 207.

Figure 3:
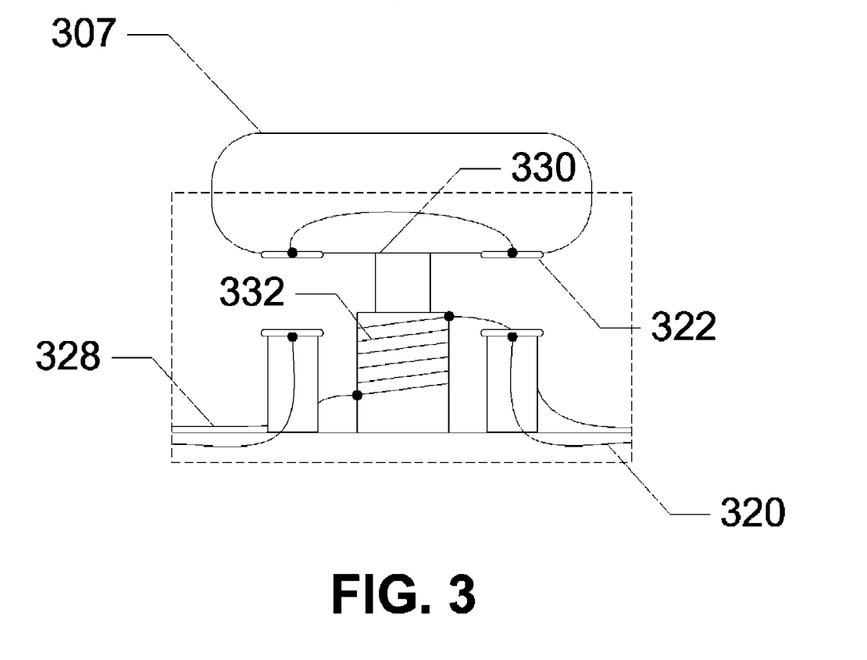
FIG. 3 shows a dynamic key on a keyboard where the sensitivity of the dynamic key is alterable by magnetic force, according to an exemplary embodiment of the present invention.

FIG. 3 shows a dynamic key on a keyboard where the sensitivity of the dynamic key is alterable by magnetic force, according to an exemplary embodiment of the present invention. In this embodiment, the dynamic key includes a button 307, a contact 322, a contact wire 320, a coiled wire 332, a magnet 330, and a current varying wire 328. Button 307 provides a location for the user to press in order to type a desired alphanumeric character. When button 307 is pressed, contact 322 touches contact wire 320. Similar to FIG. 2, contact 322 is a conductive point on either side of button 307 which, when in contact with contact wire 320, creates a closed circuit. When this circuit is closed, the dynamic key sends a signal to the device that the key has been pressed. Coiled wire 332 is a conductive wire which current may pass through from current varying wire 328. Current varying wire 328 runs from a power source through coiled wire 332 and back to the power source, creating a circuit. When a current flows through current varying wire 328, the current flows through coiled wire 332, creating a magnetic field. This magnetic field, depending upon its strength, makes it harder or easier for magnet 330 to be inserted through coiled wire 332. This makes button 307 harder or easier to press.

Other embodiments of an electronically force-varying key will be apparent to those having skill in the art. The keys in FIGS. 2 and 3 complete a circuit when pressed and break the circuit when released. The wires are typically planned out in a circuit board along with all the other wires in the text-entry device. Exemplary embodiments make use of a single current varying wire, yet other embodiments may require more than one current varying wire depending on the setup. The button is usually nothing more than a piece of plastic or rubber with one or more contacts on the side opposite the user.

Figure 4:
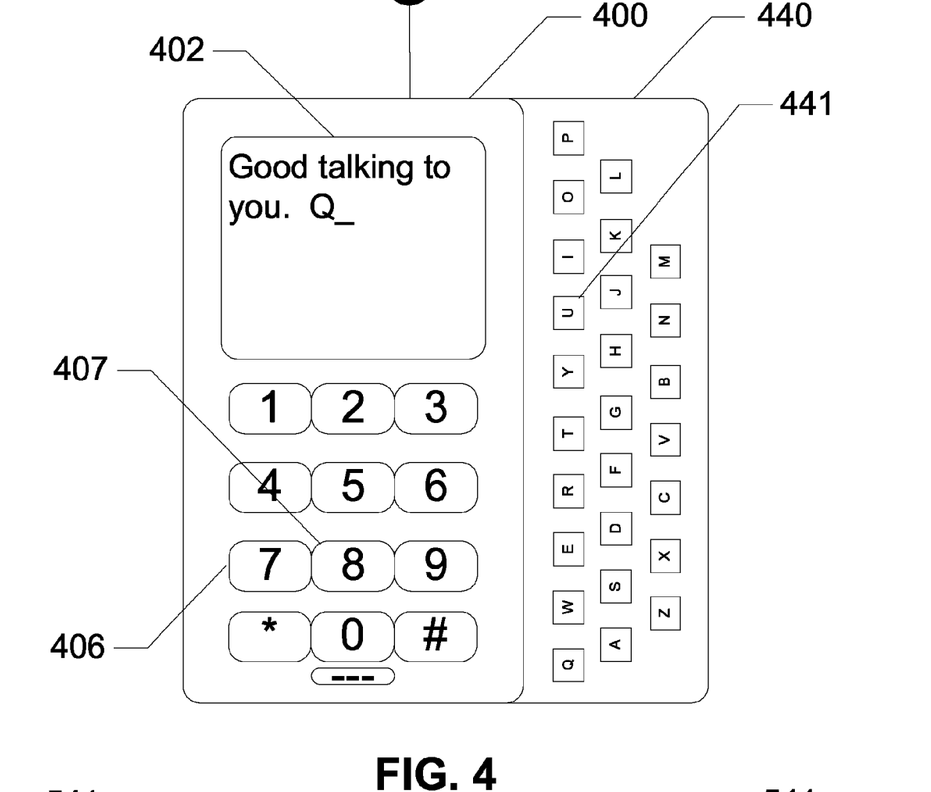
FIG. 4 shows a text-entry device with a slide-out dynamic QWERTY keyboard, according to an exemplary embodiment of the present invention.

FIG. 4 shows a text-entry device 400 with a slide-out dynamic QWERTY keyboard 440, according to an exemplary embodiment of the present invention. In this embodiment, a user has begun typing a message on a dynamic keyboard 406 of text-entry device 400, the message visible on a display 402. The last letter the user has selected is 'Q'. As the probability of the next letter being 'U' is very high, a keyboard logic makes all of the less probable keys more difficult to press. This may be done by sending a current through a fluid, as seen in FIG. 2, by creating a magnetic field, as seen in FIG. 3, etc. The '8' key 407, the key corresponding to 'U' when only using a numeric keyboard, is easier to press than other buttons on dynamic keyboard 406. On slide-out dynamic QWERTY keyboard 440, 'U' key 441 requires less force to press than the other keys on slide-out dynamic QWERTY keyboard 440.

Figure 5A:
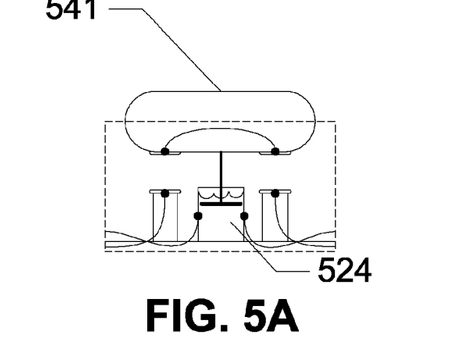
FIGS. 5A and 5B show keys from a dynamic keyboard wherein the viscosity of a fluid is altered due to running a current through the fluid, according to an exemplary embodiment of the present invention.
Figure 5B:
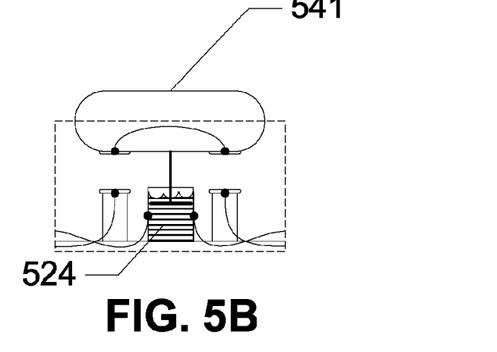

FIGS. 5A and 5B show keys from a dynamic keyboard wherein the viscosity of a fluid is altered due to running a current through the fluid, according to an exemplary embodiment of the present invention. When a key has a higher probability of being the next desired key, current is run through the fluid of these keys such that the viscosity of the fluid of the probable keys is lower than that for less probable keys. This makes pressing the desired key easier while accidentally pressing the incorrect key becomes harder.

FIG. 5A shows a dynamic key with a normal viscosity, according to an exemplary embodiment of the present invention. In this embodiment, the viscosity of a fluid 524 may be at a certain base level due to the properties of fluid 524 with no current running through it, or may be at a certain base level due to a set amount of current. This base level of viscosity is used for keys with a higher prediction value, such that the probable keys are easier to press. For instance, dynamic key 541 of this figure may correspond to the 'U' key 441 from FIG. 4. As 'Q' was the first letter of a word in FIG. 4, the most likely letter to follow the 'Q' is 'U'. As the most likely letter to follow, the viscosity of dynamic key 541 is at the base level, with surrounding keys having a charge flowing through their fluid such that their viscosity is higher.

FIG. 5B shows a dynamic key with an increased viscosity, according to an exemplary embodiment of the present invention. In this embodiment, fluid 524 is at a higher viscosity due to the current flowing through fluid 524. For instance, this is the new state of 'U' key 441 after 'U' key 441 has already been pressed once. Because the likelihood of a second 'U' to follow the first 'U' is very low, a current is run through fluid 524 such that the viscosity of fluid 524 is increased and 'U' key 441 becomes harder to press.

Figure 6:
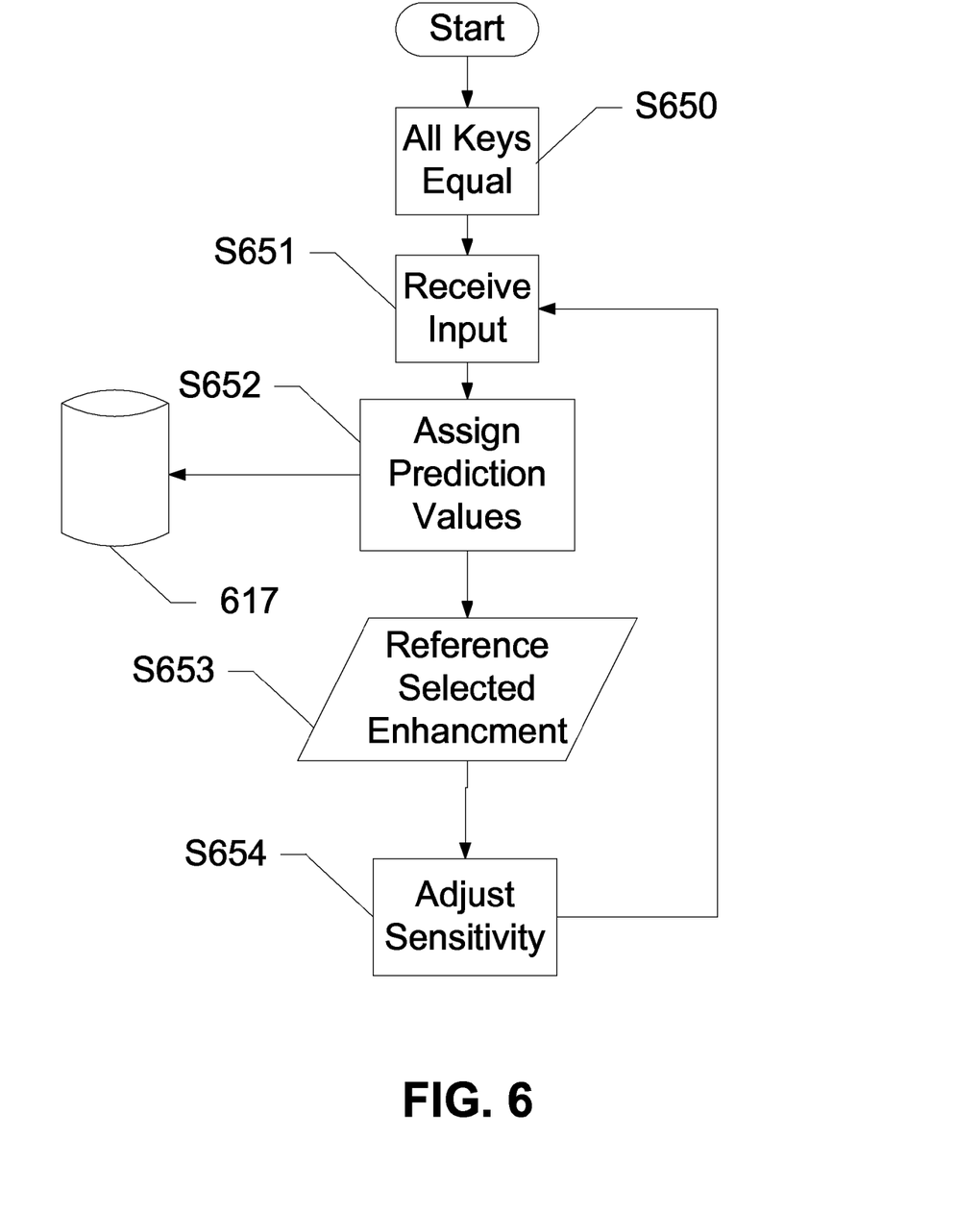
FIG. 6 shows a flowchart of a method of dynamically enhancing a virtual keyboard of a text-entry device, according to an exemplary embodiment of the present invention.

FIG. 6 shows a flowchart of a method of dynamically enhancing a virtual keyboard of a text-entry device, according to an exemplary embodiment of the present invention. In this embodiment, when the user begins entering text into an e-mail, text message, or other writing, all of the keys of the dynamic keyboard are equally sensitive S650. The dynamic keyboard receives an input S651 from, for example, a key entry. With an input received, keyboard logic on the text-entry device assigns prediction values to each of the keys on the keyboard S652. This is accomplished by referencing language database 617. This prediction value is the chance that a given character with a corresponding key is the character that will be entered by the user to complete a word or sentence. With the prediction values assigned, the keyboard logic references a selected enhancement to the keyboard S653. The database informs the keyboard logic which keys should require more force to press, and how much, based upon the prediction values. The keyboard logic then instructs a processor to command a power source to run current through current varying wires, adjusting the sensitivity of keys S654.

Figure 7A:
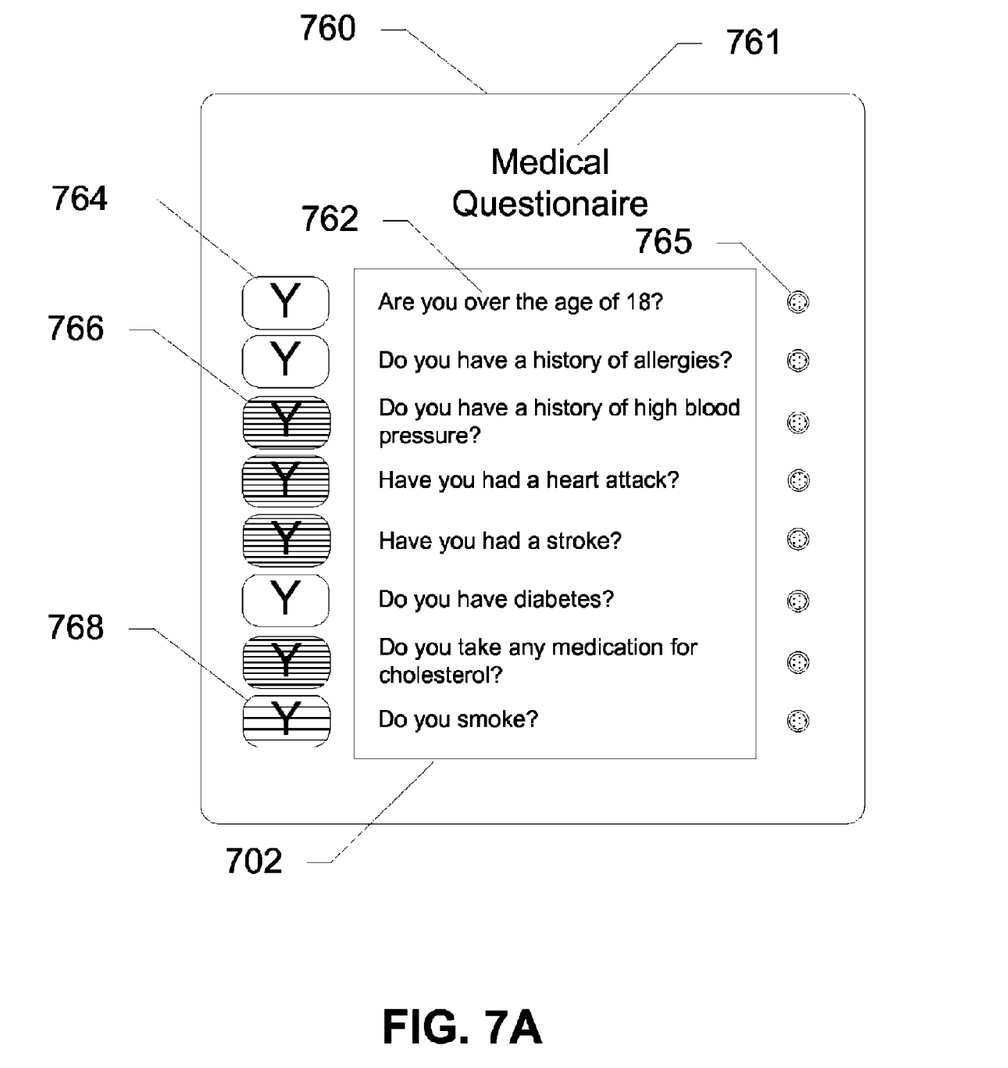
FIGS. 7A and 7B show a dynamic medical questionnaire on a display of a text-entry device, according to an exemplary embodiment of the present invention.

FIG. 7A shows a dynamic medical questionnaire 761 on a display 702 of a text-entry device 760, according to an exemplary embodiment of the present invention. In this embodiment, dynamic medical questionnaire 761 improves the efficiency of inputs by a user. As shown, the user has not answered a question 762 by selecting key 764 which states that the user is over the age of 18. This is noticeable as a selection indicator 765 is not lit up or marked. Because the user has not stated that the user is over the age of 18, certain medical problems are very unlikely. For instance, the user under the age of 18 may have a history of allergies or have diabetes, but is very unlikely to have high blood pressure, have had a heart attack or stroke, take medication for cholesterol, or smoke regularly. Because the probability of having a history of high blood pressure is very low, key 766 corresponding to this history is more difficult to press when the user has not selected key 764 stating the user is over 18. Because it is possible that the user smokes under age 18, but not probable, key 768 is slightly harder to press than the base level. The keys which require more pressure to select are less likely to be accidentally pressed when the user is answering medical questionnaire 761.

Figure 7B:
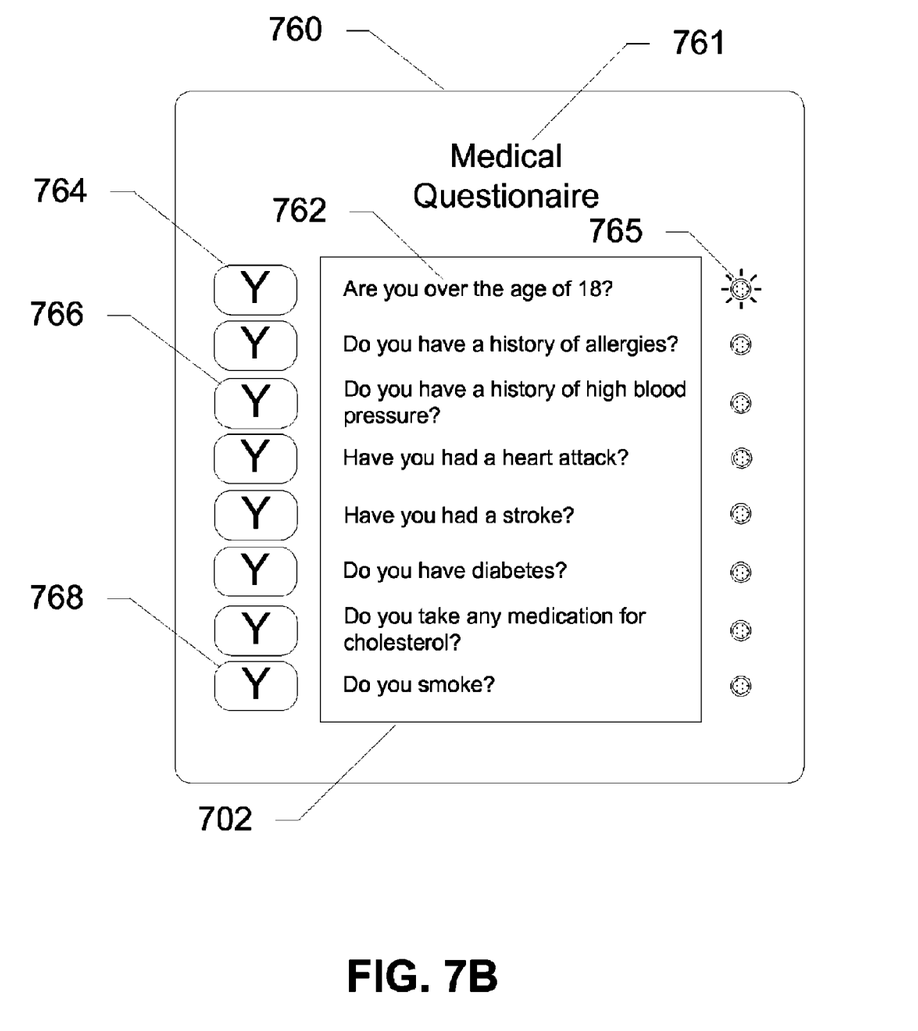

FIG. 7B shows a dynamic medical questionnaire 761 on a display 702 of a text-entry device 760, according to an exemplary embodiment of the present invention. In this embodiment, dynamic medical questionnaire 761 improves the efficiency of inputs by a user. As shown, the user has answered question 762, by pressing key 764, which states that the user is over the age of 18. This is noticeable as a selection indicator 765 is lit up or marked. Because the user is over the age of 18, certain medical problems become more likely. For instance, the user over the age of 18 may have a history of allergies, have diabetes, have high blood pressure, have had a heart attack or stroke, take medication for cholesterol, or smoke regularly. Because the probability of having a history of high blood pressure is much higher for a patient over the age of 18 than one under the age of 18, key 766 corresponding to this history is now the base level sensitivity when the user has selected key 764 stating the user is over 18. Because it is more probable that the user over the age of 18 smokes than the user under the age of 18, key 768 is now at the base level sensitivity.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a processor; and
   a memory in communication with the processor, the memory storing computer-readable instructions that, when executed by the processor, cause the processor to perform operations comprising
   detecting selection of a key on a keyboard, the key being associated with a character;
   determining, based upon the character, prediction values for keys on the keyboard, each of the prediction values comprising a statistical probability that a corresponding key on the keyboard is to be selected;
   assigning the prediction values to the keys; and
   varying a force to press one of the keys by varying a viscosity of a damping fluid at the one of the keys, wherein varying the force comprises adjusting a current to the damping fluid based upon a corresponding prediction value associated with the one of the keys.

2. The device in claim 1, wherein adjusting the current comprises adjusting the current an amount that is proportional to the corresponding prediction value.

3. The device in claim 1, wherein the one of the keys is coupled to an electronically adjustable lever comprising a plunger in the damping fluid.

4. The device in claim 1, wherein determining the corresponding prediction comprises referencing a language database.

5. The device in claim 4, wherein the language database includes a dictionary and statistical data.

6. The device in claim 1, further comprising a transceiver that communicates using a cellular technology.

7. The device in claim 1, further comprising a transceiver that communicates using a wireless local area network technology.

8. A method comprising;
   detecting, by a device comprising a processor and a keyboard, selection of a key on the keyboard, the key being associated with a character;
   determining, by the device, prediction values for keys on the keyboard, each of the prediction values comprising a statistical probability that a corresponding key on the keyboard is to be selected based upon the character and a further character associated with the corresponding key;
   assigning, by the device, the prediction values to the keys; and
   varying, by the device, a force to press one of the keys by varying a viscosity of a damping fluid at the one of the keys, wherein varying the force comprises adjusting a current to the damping fluid based upon a corresponding prediction value associated with the one of the keys.

9. The method of claim 8, wherein adjusting the current comprises adjusting the current an amount that is proportional to the corresponding prediction value.

10. The method of claim 8, wherein determining the corresponding prediction value comprises referencing a language database.

11. The method in claim 10, wherein the language database includes a dictionary and statistical data.

12. The method of claim 8, further comprising resetting a keyboard such that the keys require a same amount of force to be selected.

13. A non-transitory computer readable medium having instructions stored thereon that, when executed by a processor, cause the processor to perform operations comprising:
  detecting selection of a key on a keyboard, the key being associated with a character;
  determining, based upon the character, prediction values for keys on the keyboard, each of the prediction values comprising a statistical probability that a corresponding key on the keyboard is to be selected;
  assigning the prediction values to the keys; and
  varying a force to press one of the keys by varying a viscosity of a damping fluid at the one of the keys, wherein varying the force comprises adjusting a current to the damping fluid based upon a corresponding prediction value associated with the one of the keys.

14. The non-transitory computer readable medium of claim 13, wherein assigning the corresponding prediction value comprises referencing a language database.

15. The non-transitory computer readable medium of claim 13, further instructions that, when executed by the processor, cause the processor to perform operations further comprising resetting a keyboard such that the keys require a same amount of force to be selected.

* * * * *